(12) United States Patent
Milton et al.

(10) Patent No.: US 7,586,868 B2
(45) Date of Patent: Sep. 8, 2009

(54) METHOD AND APPARATUS FOR CONTROLLING DISTRIBUTED TRANSCODERS

(75) Inventors: Lewis J. Milton, Glencoe, IL (US); James S. Marin, Murphy, TX (US); Gino A. Scribano, St. Charles, IL (US)

(73) Assignee: Motorola, Inc, Schaumburg, IL (US)

( * ) Notice: Subject to any disclaimer, the term of this patent is extended or adjusted under 35 U.S.C. 154(b) by 629 days.

(21) Appl. No.: 10/888,834

(22) Filed: Jul. 9, 2004

(65) Prior Publication Data

US 2005/0013281 A1    Jan. 20, 2005

Related U.S. Application Data

(60) Provisional application No. 60/487,182, filed on Jul. 14, 2003.

(51) Int. Cl.
*H04Q 7/20* (2006.01)
(52) U.S. Cl. ...................................... 370/328
(58) Field of Classification Search ................ 370/466, 370/310, 328, 464–467; 455/226.1, 230, 455/313
See application file for complete search history.

(56) References Cited

U.S. PATENT DOCUMENTS

| | | | |
|---|---|---|---|
| 5,497,396 A | | 3/1996 | Delprat |
| 5,771,452 A | * | 6/1998 | Hanley et al. ............... 455/445 |
| 5,995,923 A | * | 11/1999 | Mermelstein et al. ....... 704/219 |
| 6,138,022 A | * | 10/2000 | Strawczynski et al. ...... 455/445 |
| 6,272,358 B1 | * | 8/2001 | Brent et al. .................. 455/560 |
| 6,363,339 B1 | * | 3/2002 | Rabipour et al. ............ 704/201 |
| 6,512,918 B1 | * | 1/2003 | Malomsoky et al. ........ 455/403 |
| 6,577,620 B1 | | 6/2003 | Galyas et al. |
| 6,718,183 B1 | * | 4/2004 | Blust et al. .................. 455/560 |
| 6,990,340 B2 | * | 1/2006 | Tamura et al. ........... 455/432.2 |
| 7,023,819 B2 | * | 4/2006 | Falsafi ........................ 370/328 |
| 2004/0022208 A1 | * | 2/2004 | Dahod et al. ................. 370/328 |
| 2004/0022266 A1 | * | 2/2004 | Greis et al. .................. 370/467 |
| 2004/0082366 A1 | * | 4/2004 | Longoni et al. ............. 455/561 |
| 2004/0166834 A1 | * | 8/2004 | Omar et al. ............... 455/414.1 |
| 2004/0170155 A1 | * | 9/2004 | Omar et al. .................. 370/349 |
| 2004/0196867 A1 | * | 10/2004 | Ejzak et al. .................. 370/468 |

FOREIGN PATENT DOCUMENTS

KR    20000047178    7/2000

* cited by examiner

*Primary Examiner*—Dmitry Levitan
(74) *Attorney, Agent, or Firm*—Steven A. May

(57) ABSTRACT

A wireless communication system comprises an infrastructure that includes a first network element that is upstream of a second network element, wherein the first network element comprises a first transcoder and the second network element comprises a second transcoder. The communication system controls a transcoding of voice by determining a first bearer type supported by the first transcoder, determining a second bearer format type mutually supported by the infrastructure and a mobile station serviced by the infrastructure, and selecting one of the first transcoder and the second transcoder to transcode the voice based on the first bearer format type and the second bearer format type.

20 Claims, 5 Drawing Sheets

US 7,586,868 B2

METHOD AND APPARATUS FOR CONTROLLING DISTRIBUTED TRANSCODERS

REFERENCE(S) TO RELATED APPLICATION(S)

The present application claims priority from provisional application Ser. No. 60/487,182, entitled "METHOD AND APPARATUS FOR CONTROLLING DISTRIBUTED TRANSCODERS," filed Jul. 14, 2003, which is commonly owned and incorporated herein by reference in its entirety.

FIELD OF THE INVENTION

The present invention relates generally to cellular communication systems, and, in particular, to transcoding functionality in a cellular communication system

BACKGROUND OF THE INVENTION

In a typical Code Division Multiple Access (CDMA) cellular network, such as a second generation (2G) CDMA communication network, transcoders are located in a radio access network (RAN), and in particular in a base station controller (BSC) located in the RAN. The transcoders receive compressed voice packets from a mobile station and convert the voice packets to pulse code modulated (PCM) signals for transmission through a circuit switched core network included in the cellular network. The BSCs then transmit the PCM signals upstream through the circuit switched core network and, via the core network, to a Public Switched Telephone Network (PSTN) coupled to the operator's cellular network. Similarly, PCM signals received by a 2G CDMA cellular network from a PSTN that are intended for a mobile station serviced by the RAN are transmitted as PCM signals through the circuit switched core network to the RAN, where the transcoder in the RAN converts the PCM signals to compressed voice packets. The RAN then transmits the compressed voice packets to the mobile station.

The development of next generation CDMA networks, such as a cdma2000 cellular network, have allowed system operators to install packet switched core networks in parallel with the circuit switched core networks, thereby permitting data packets to be transmitted through the cellular networks in parallel with circuit switched signals. The installation of such packet switched core networks permits a system operator to transmit voice data as a compressed voice packet through the packet switched core network, rather than transmit voice data as PCM signals through the circuit switched core network. To facilitate transmission of voice through a cellular network in a data packet format, operators of cdma2000 cellular networks have expressed an interest in relocating the transcoders closer to the PSTN. In addition, a relocation of transcoders to a more centralized location deeper in the cellular network can reduce system costs by providing a more centralized transcoder function, as opposed to a widely distributed, RAN-based, transcoder function, and by permitting voice services to be transported over more of a backhaul network in a compressed format as opposed to an uncompressed format.

However, when a legacy CDMA communication system is upgraded with a relocated transcoder function, a result may be a provision of a transcoding function in each of a core network and a RAN. Furthermore, some systems may service mobile stations that are not capable of transmitting voice in a format compatible for transmission over a packet switched core network, thus necessitating a transcoding function in a RAN. A result is that multiple transcoding functions may reside along a voice signal's path. The problem then arises as to which of the multiple transcoding functions shall encode/decode received voice.

Therefore, there exists a need for controlling where, in the cellular system, the transcoding function is performed, and what transcoding type(s) should be used in the serving network elements.

DETAILED DESCRIPTION OF THE INVENTION

Figure 1:
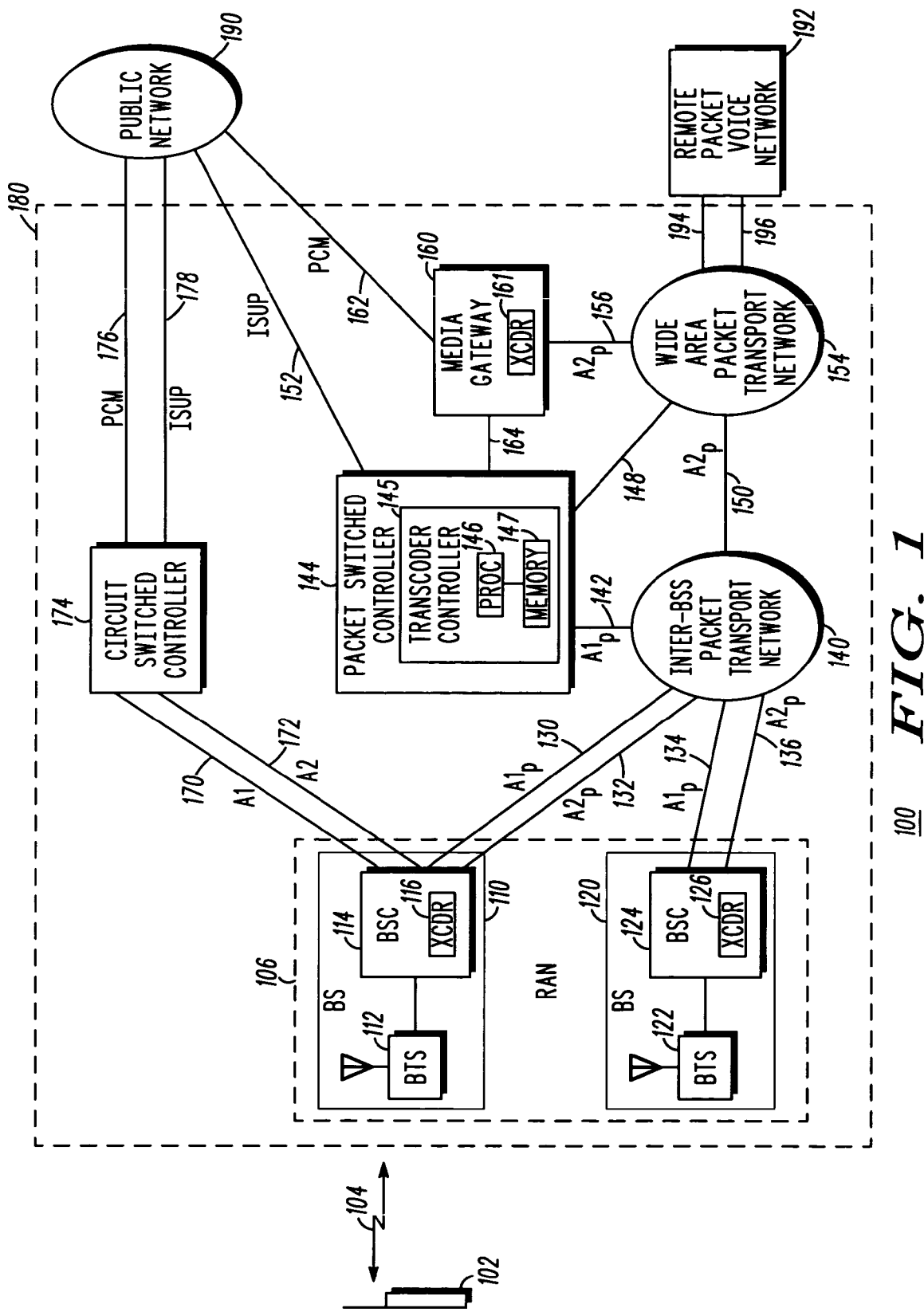
FIG. 1 is a block diagram of a wireless communication system in accordance with an embodiment of the present invention.

To address the need for a method and an apparatus that controls where, in the cellular system, the transcoding function is performed and what transcoding type(s) should be used in the serving network elements, a wireless communication system is provided that comprises an infrastructure having a first network element that is upstream of a second network element, wherein the first network element comprises a first transcoder and the second network element comprises a second transcoder. The communication system controls a transcoding of voice by determining a first bearer type supported by the first transcoder, determining a second bearer format type mutually supported by the infrastructure and a mobile station serviced by the infrastructure, and selecting one of the first transcoder and the second transcoder to transcode the voice based on the first bearer format type and the second bearer format type.

Generally, an embodiment of the present invention encompasses a method for controlling a transcoding of voice in a wireless communication system having an infrastructure comprising a first network element that is upstream of a second network element, wherein the first network element comprises a first transcoder and the second network element comprises a second transcoder. The method includes determining a first bearer format type supported by the first transcoder, determining a second bearer format type mutually supported by a mobile station and the infrastructure, and selecting one of the first transcoder and the second transcoder to transcode the voice based on the first bearer format type and the second bearer format type.

Another embodiment of the present invention encompasses a transcoder controller comprising at least one memory device that maintains a first bearer format type supported by a first transcoder associated with a first network element. The transcoder controller further comprises a processor coupled to the at least one memory device that receives a second bearer format type mutually supported by a mobile station and a second transcoder associated with a second network element and selects one of the first transcoder and the second transcoder to transcode voice based on the first bearer format type and the second bearer format type.

Still another embodiment of the present invention encompasses a distributed transcoding system comprising a first network element comprising a first transcoder, a second network element comprising a second transcoder, wherein the second network element is downstream from the first network element, and a transcoder controller coupled to each of the first network element and the second network element. The transcoder controller maintains a first bearer format type supported by the first transcoder, receives a second bearer format type that is mutually supported by a mobile station and the second transcoder, and selects one of the first transcoder and the second transcoder to transcode voice based on the first bearer format type and the second bearer format type.

The present invention may be more fully described with reference to FIGS. 1-3. FIG. 1 is a block diagram of a wireless communication system 100 in accordance with an embodiment of the present invention. Communication system 100 includes a Radio Access Network (RAN) 106 that comprises multiple base stations (BSs) 110, 120. Each BS of the multiple BSs 110, 120 includes a respective at least one base transceiver station (BTS) 112, 122 operably coupled to a respective base station controller (BSC) 114, 124. Each BSC 114, 124 optionally includes a respective transcoder 116, 126 that is capable of is capable of decoding voice data packets received from MS 102 into at least one of multiple bearer formats, such as SMV (IS-893), EVRC (IS-127), 13 k-QCELP (IS-733), 8 k-QCELP (IS-96C), and G.711, for conveyance to a public network 190 or a remote packet voice network 192 and is further capable of encoding voice data received from public network 190 or remote packet voice network 192 in at least one of multiple bearer formats into voice data packets for conveyance to MS 102.

Communication system 100 further comprises a mobile station (MS) 102 in wireless communication with a BS, such as BS 110, of RAN 106 via an air interface 104. Air interface 104 comprises a forward link (not shown) having multiple communication channels, such as one or more forward link control channels, one or more forward link traffic channels, and a forward link paging channel, and a reverse link (not shown) having multiple communication channels, such as one or more reverse link control channels, one or more reverse link traffic channels, and a reverse link access channel.

Each BS 110, 120, preferably a respective BSC 114, 124 of the BS 110, 120, is coupled to an Inter-BS Packet Transport network 140 via a respective signaling interface 130, 134 and a respective bearer interface 132, 136. Inter-BS Packet Transport network 140 is further coupled to a packet switched controller 144 via a signaling interface 142, thereby providing a signaling link between each BS of the multiple BSs 110, 120 and the packet switched controller. Inter-BS Packet Transport network 140 is still further coupled to a wide area packet transport network 154 via a bearer interface 150. In turn, wide area packet transport network 154 is further coupled to a local Media Gateway (MGW) 160 via a bearer traffic interface 156, thereby providing a bearer traffic link between each BS of the multiple BSs 110, 120 and Media Gateway 160. Wide area packet transport network 154 is also coupled to packet switched controller 144 via a signaling interface 148 and to remote packet voice network 192 via a signaling interface 194 and a bearer interface 196. Preferably, each of signaling interfaces 130, 134, and 142 comprises an A1 interface that has been modified to support an exchange of signaling messages in a packet voice format (which interfaces are depicted in FIG. 1 as $A1_p$ interfaces). In addition, preferably each of bearer interfaces 132, 136, 150, and 156 comprises an A2 interface that has been modified to support the exchange of bearer traffic in a packet voice format (which interfaces are depicted in FIG. 1 as $A2_p$ interfaces).

Media Gateway 160 optionally includes a transcoder 161 that, similar to transcoders 116 and 126, is capable of is capable of decoding voice data packets received from MS 102 into at least one of multiple bearer formats, such as SMV, EVRC, 13 k-QCELP, 8 k-QCELP, and G.711, for conveyance to public network 190 or remote packet voice network 192 and is further capable of encoding voice data received from public network 190 or remote packet voice network 192 in at least one of the multiple bearer formats into voice data packets for conveyance to MS 102.

Packet switched controller 144 includes a transcoder controller 145 that determines a transcoder of the multiple transcoders 116, 161 possible in communication system 100 that will encode and decode voice traffic during a communication session involving MS 102. Transcoder controller 145 includes a processor 146, such as one or more microprocessors, microcontrollers, digital signal processors (DSPs), combinations thereof or such other devices known to those having ordinary skill in the art, and one or more associated memory devices 147, such as random access memory (RAM), dynamic random access memory (DRAM), and/or read only memory (ROM) or equivalents thereof, that maintain data and programs that may be executed by the corresponding processor. The one or more memory devices 147 may further maintain bearer format types supported by one or more of transcoder 161 of Media Gateway 160 and transcoder 116 of BSC 114. Preferably, packet switched controller 144 comprises a packet voice Soft Switch that is available from Motorola, Inc, of Schaumburg, Ill., and that has been modified to perform the functions described herein.

Media Gateway 160 is further coupled to public network 190, preferably a Public Switched Telephone Network (PSTN), via a bearer interface 162, preferably a pulse code modulation (PCM) interface, and to packet switched controller 144 via a signaling interface 164. Public network 190 is further coupled to packet switched controller 144 via a signaling interface 152, preferably an ISDN User Part (ISUP) interface. Inter-BS Packet Transport network 140, packet switched controller 144, wide area packet transport network 154, Media Gateway 160, and interconnecting interfaces 130, 132, 142, 148, 150, 152, 156, 162, 164, 194, and 196 may be collectively referred to as a packet switched core network and provide a packet voice communication link between each BS 110, 120 and each of public network 190 and remote packet voice network 192.

BS 110, preferably BSC 114 of BS 110, is further coupled to a circuit switched controller 174, preferably a circuit switched MSC, via a signaling interface 170, preferably an A1 interface, and a bearer interface 172, preferably an A2 interface. In turn, circuit switched controller 174 is coupled to public network 190 via a bearer interface 176, preferably a PCM interface, and a signaling interface 178, preferably an ISUP interface. Circuit switched controller 174 and the associated interfaces 170, 172, 176, and 178 coupling the circuit switched controller 174 to BS 110 and public network 190 may be collectively referred to as a circuit switched core network and provide a circuit switched communication link between BS 110 and public network 190. RAN 106, BS 110, packet switched controller 144, Media Gateway 160, transport networks 140 and 154, and circuit switched controller 174 are collectively referred to herein as an infrastructure 180 of communication system 100.

Communication system 100 comprises a wireless packet voice communication system. In order for MS 102 to engage in a voice communication with an external network 190, 192 connected to infrastructure 180, each of BS 110, packet switched controller 144, Media Gateway 160, transport networks 140 and 154, and circuit switched controller 174 operates in accordance with well-known wireless telecommunications protocols. By operating in accordance with well-known protocols, a user of MS 102 can be assured that MS 102 will be able to communicate with infrastructure 180 and establish a communication link with an external network 190, 192 via the infrastructure. Preferably, communication system 100 operates in accordance with the 3GPP2 and TIA/EIA (Telecommunications Industry Association/Electronic Industries Association) IS-2001, or IOS (Inter Operability Specification), standards, which provides a compatibility standard cdma2000 or 1xEV-DO systems and wherein each communication channel of the multiple communication channels of each of the forward link and the reverse link of air interface 104 comprises one or more orthogonal codes, such as Walsh codes. The standard specifies wireless telecommunications system operating protocols, including radio system parameters and call processing procedures. However, those who are of ordinary skill in the art realize that communication system 100 may operate in accordance with any one of a variety of wireless packet-oriented voice communication systems, such as a Global System for Mobile communication (GSM) communication system, a Time Division Multiple Access (TDMA) communication system, a Frequency Division Multiple Access (FDMA) communication system, or an Orthogonal Frequency Division Multiple Access (OFDM) communication system.

When MS 102 establishes a communication session with infrastructure 180, it may be possible for any one of multiple serially-distributed transcoders 116, 161 located along a voice bearer path associated with the MS to encode and decode voice traffic originating from or destined for the MS. In addition, communication system 100 may determine to establish the communication session as a transcoder free operation (TrFO), wherein voice traffic propagates through the communication system without being processed by any transcoder 116, 161 of infrastructure 180. Accordingly, communication system 100 provides for a selection of a transcoder of the multiple serially-distributed transcoders 116, 161 to transcode the voice traffic when the voice traffic is to be transcoded by the infrastructure.

Figure 2A:
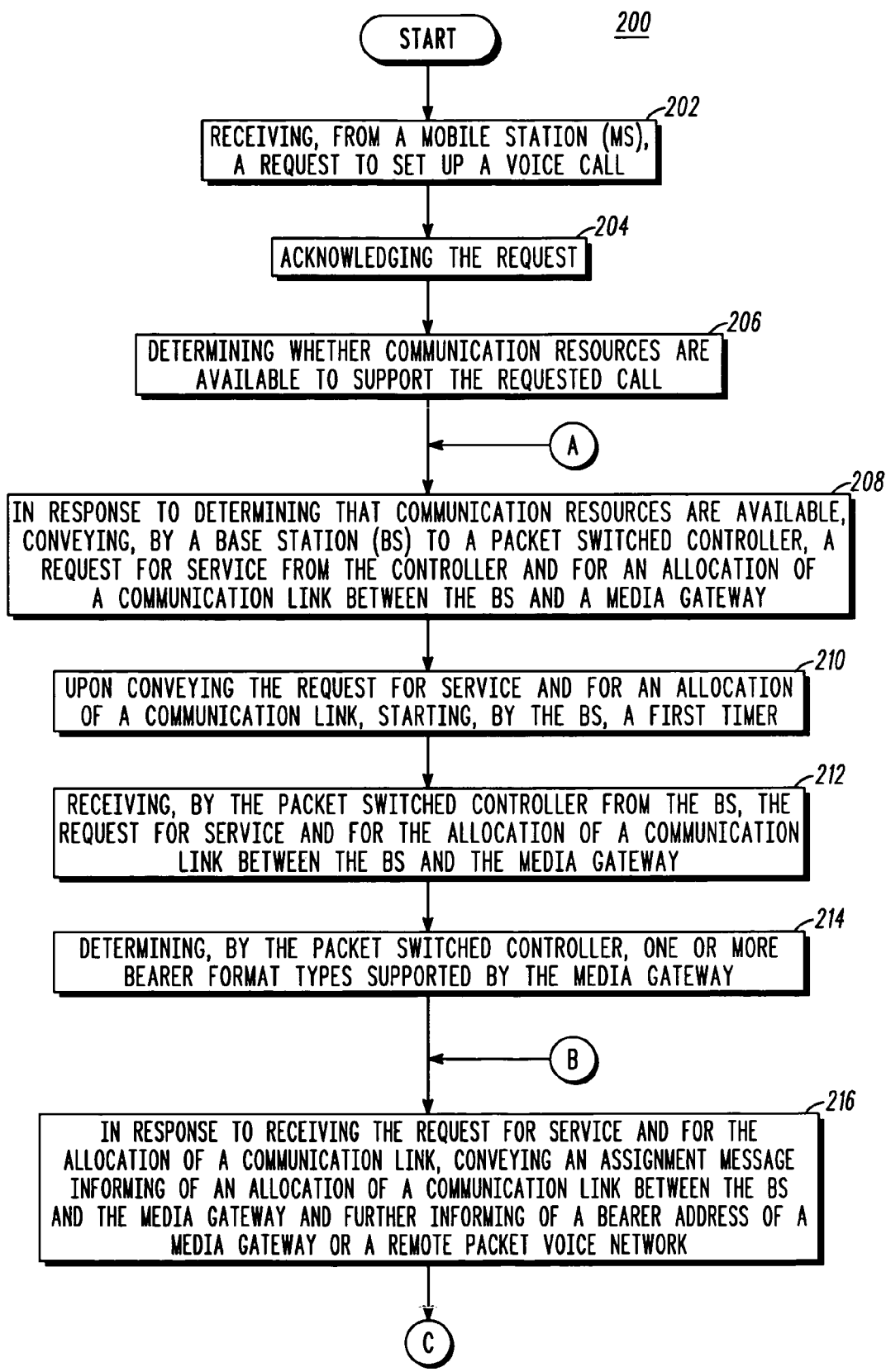
FIG. 2A is a logic flow diagram of a method executed by the communication system of FIG. 1 in controlling which transcoder of a first transcoder residing in a first network element and a second transcoder residing in a second network element that is downstream from the first network element may transcode voice traffic in accordance with an embodiment of the present invention.
Figure 2B:
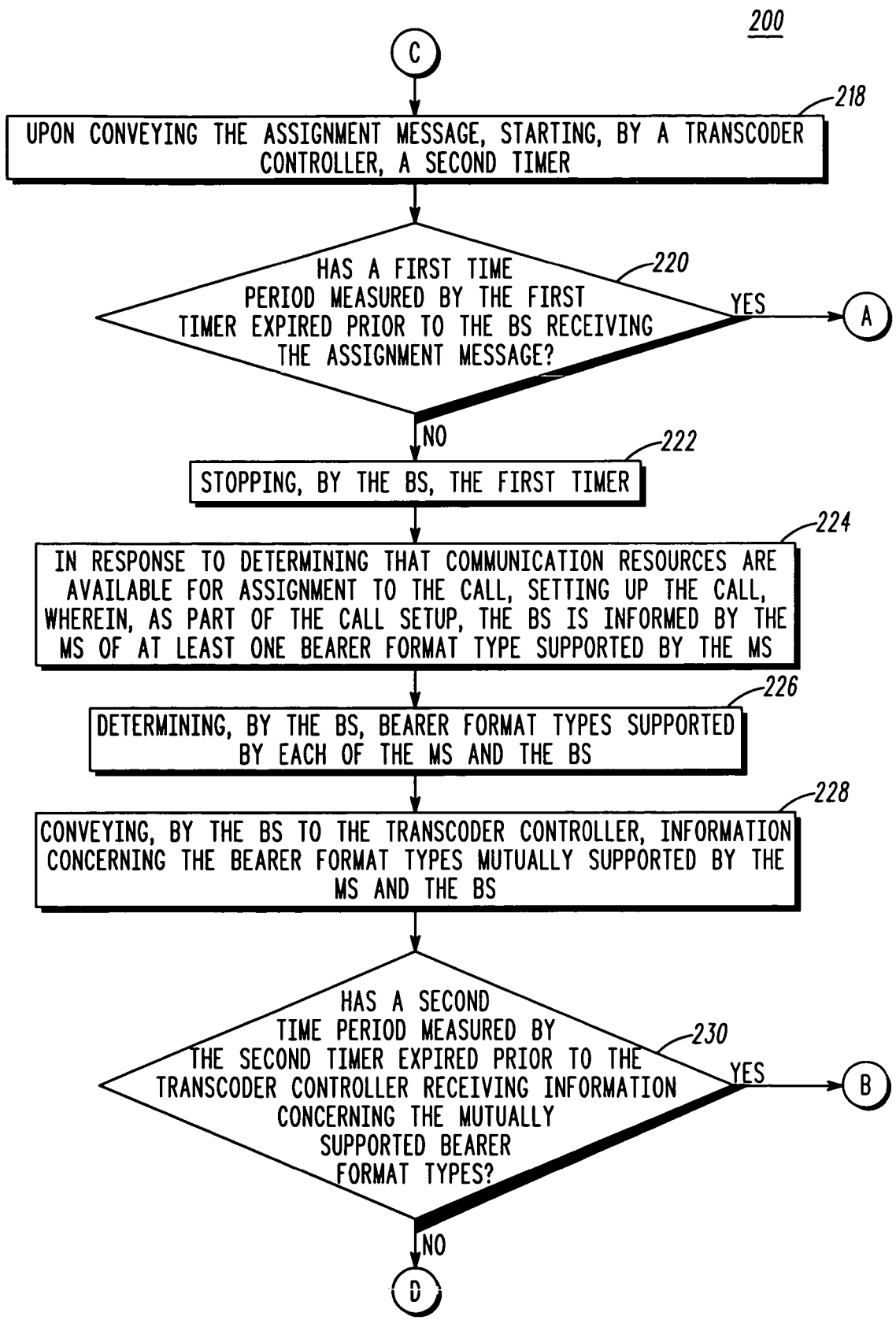
FIG. 2B is a continuation of the logic flow diagram of FIG. 2A depicting a method executed by the communication system of FIG. 1 in controlling which transcoder of a first transcoder residing in a first network element and a second transcoder residing in a second network element that is downstream from the first network element may transcode voice traffic in accordance with an embodiment of the present invention.
Figure 2C:
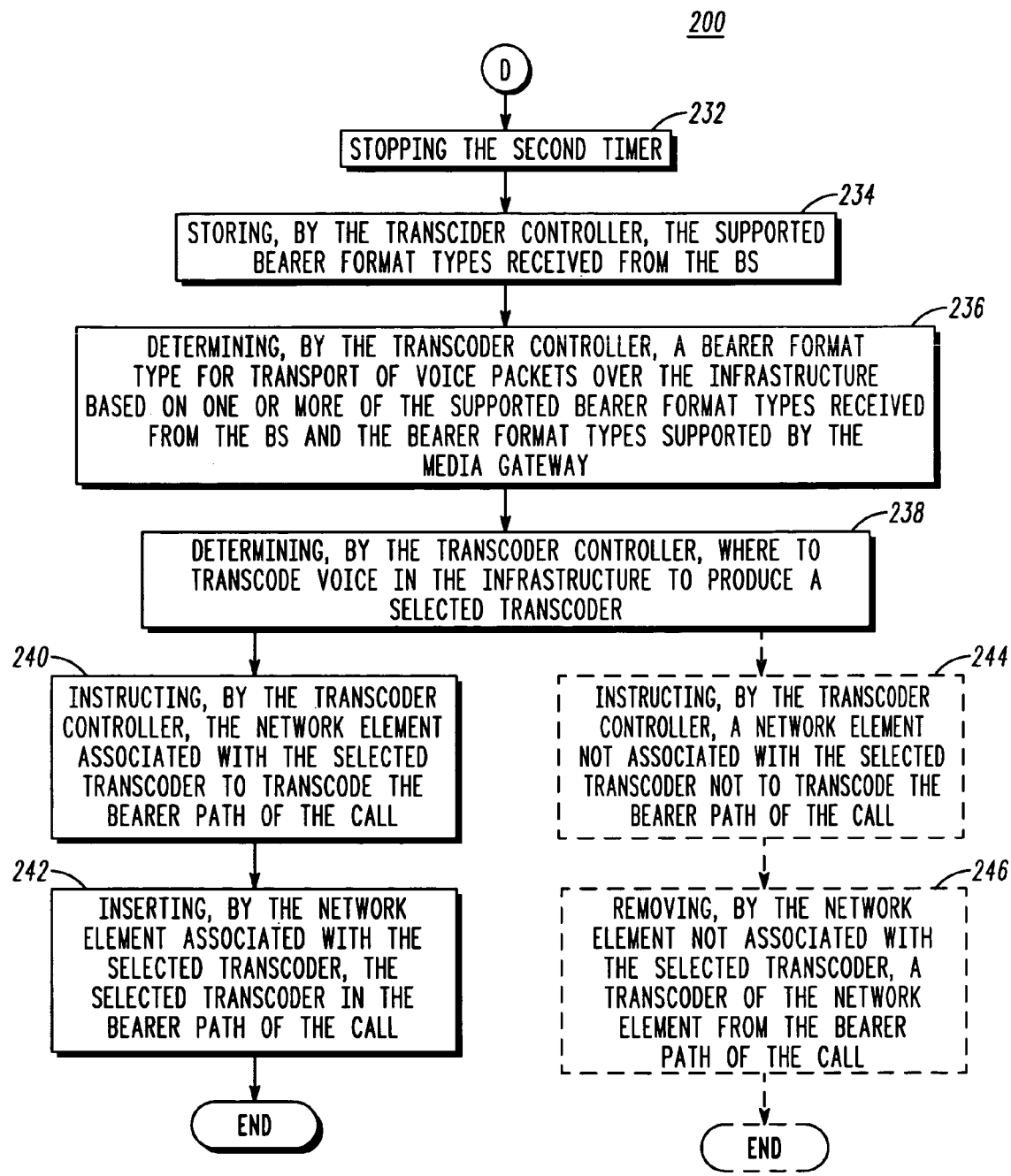
FIG. 2C is a continuation of the logic flow diagrams of FIGS. 2A and 2B depicting a method executed by the communication system of FIG. 1 in controlling which transcoder of a first transcoder residing in a first network element and a second transcoder residing in a second network element that is downstream from the first network element may transcode voice traffic in accordance with an embodiment of the present invention.
Figure 3:
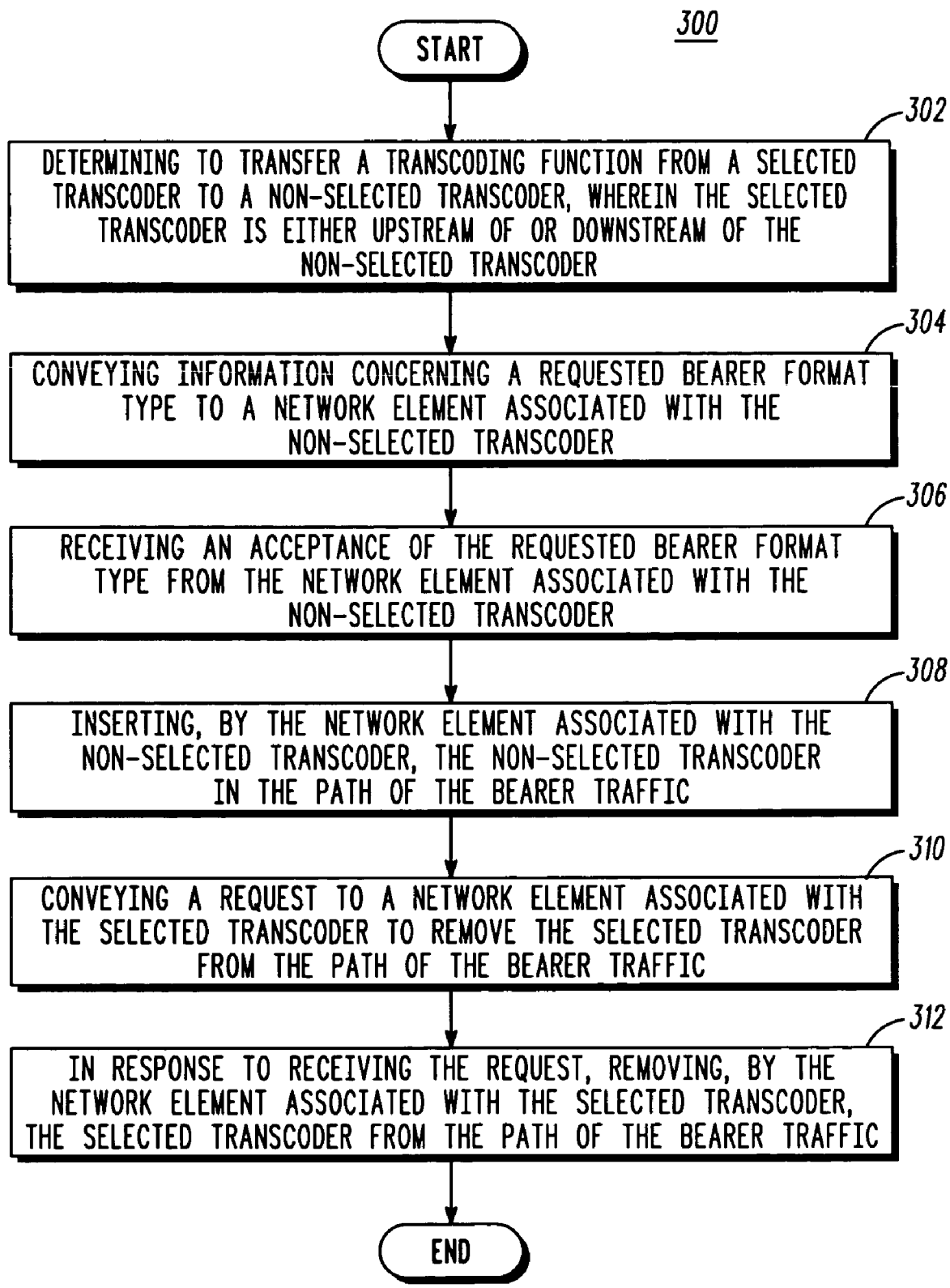
FIG. 3 is a logic flow diagram of a method executed by the communication system of FIG. 1 in transferring a transcoding function from a first transcoder residing in a first network element and a second transcoder residing in a second network element that is downstream from the first network element in accordance with another embodiment of the present invention.

Referring now to FIGS. 2A, 2B, and 2C, a logic flow diagram 200 is provided that illustrates a method by which communication system 100 controls which transcoder of a first transcoder residing in a first network element, such as transcoder 161 in Media Gateway 160, and a second transcoder residing in a second network element, such as transcoder 116 in BS 110, that is downstream from the first network element, shall transcode voice traffic in accordance with an embodiment of the present invention. Logic flow diagram 200 begins when MS 102 conveys to infrastructure 180, and in particular to BS 110 via BTS 112, and BS 110 receives (202) from MS 102, a request for service, that is, a request to establish a voice, or a voice and data, communication session. Preferably, the request for service comprises an Origination Message as is known in the art, which Origination Message requests service and requires a Layer 2 acknowledgment.

In response to receiving the request for service, BS 110 acknowledges (204) the request, preferably by conveying a Base Station Acknowledgment Order, as is known in the art, to MS 102. In addition, BS 110 determines (206) whether communication resources, such as a forward link traffic channel and a reverse link traffic channel in air interface 104, are available to support the requested communication session. Upon determining that such resources are available, BS 110 assembles a service request message that requests service from packet switched controller 144 and that further requests an allocation of a communication link between the BS and Media Gateway 160. Preferably the service request message comprises a CM Service Request Message as is known in the art, which CM Service Request Message is conveyed as part of a Complete Layer 3 Information message. BS 110 then conveys (208) to packet switched controller 144, and the packet switched controller, and in particular transcoder controller 145, receives (212) from BS 110, the service request message. Unless otherwise specified herein, all functions described herein as being performed by transcoder controller 145 are performed by processor 146 of the transcoder controller. Upon conveying the service request message, BS 110 starts (210) a first timer, $T_{303}$, while awaiting a response to the service request message from packet switched controller 144. Since MS 102 is awaiting an allocation of a traffic channel, such as a forward link traffic channel and a reverse link traffic channel of air interface 104, and in the meanwhile is not being power controlled, it is desirable to provide an allocation of the requested communication link with a minimum amount of delay. Accordingly, the first timer counts down a predetermined first time period corresponding to an acceptable period of time that the BS may await the response to the service request message.

When a network element upstream from BS 110 includes a transcoder, such as media gateway 160 and transcoder 161, packet switched controller 144, preferably transcoder controller 145, may determine (214) the bearer format types supported by the upstream network element, that is, by transcoder 161 of the Media Gateway, by reference to the one or more memory devices 147 of the transcoder controller. Further, in response to receiving the service request message, packet switched controller 144, preferably transcoder controller 145, conveys (216) to BS 110 an assignment message informing of an allocation of a communication link between BS 110 and Media Gateway 160 for the communication session involving MS 102, that is, an allocation of communication links in interfaces 130, 132, 142, 150, and 156, and a bearer address, preferably an $A2_p$ bearer address, of Media Gateway 160 or remote packet voice network 192. When the upstream network element, that is, Media Gateway 160, includes a transcoder, that is, transcoder 161, the assignment message may further include one or more requested bearer format types for conveyance of the voice data over the allocated $A2_p$ communication links, which requested bearer format types corresponds to bearer format types supported by the transcoder of the upstream network element. When support for multiple bearer format types exist, a priority of preference may be included. In such an instance, packet switched controller 144 determines the requested bearer format types by reference to the one or more memory devices 147, which one or more memory devices may store the bearer format types supported by the upstream network element. The BS may use the requested format type information to determine and convey a service option assignment to the MS. The BS may preferentially assign a service option to the MS, corresponding to one of the requested bearer format types included in the assignment message. Preferably, the assignment message comprises a modified version of an Assignment Request message as is known in the art, which Assignment Request message that has been modified to optionally convey the information described herein. Upon conveying the assignment message, packet switched controller 144, preferably transcoder controller 145, further starts (218) a second timer, $T_{10}$. The second timer counts down a predetermined second time period corresponding to an acceptable period of time that packet switched controller 144 may await a response from BS 110 to the conveyed assignment message.

When the first time period, as measured by the first timer, expires (220) prior to BS 110 receiving an assignment message from packet switched controller 144, logic flow diagram 200 returns to step 208, where BS 110 reconveys the service request message to the packet switched controller. When BS 110 receives the assignment message prior to the expiration of the first time period, then BS 110 stops (222) the first timer, $T_{303}$. In addition, based on the determination that forward and reverse link traffic channels are available for allocation to MS 102 for the requested call, BS 110 and MS 102 set up (224) the call over air interface 104 in accordance with well known call set up procedures.

For example, in one embodiment of the present invention, the step of setting up (224) the call may include the following steps, which steps are provided merely to illustrate one method for setting up a call and are not intended to limit the invention in any way. One of ordinary skill in the art realizes that many schemes exist for setting up a call, which schemes may be used herein without departing form the spirit and scope of the present invention. Upon determining that forward and reverse link traffic channels are available for allocation to MS 102, BS 110 conveys a channel assignment message to MS 102 over a forward link paging channel of air interface 104. The channel assignment message informs of the forward and reverse link traffic channels allocated to the communication session. In response to receiving the channel assignment message, MS 102 conveys a traffic channel preamble to BS 110 over the allocated reverse link traffic channel. When BS 110 acquires the allocated reverse link traffic channel, the BS so informs MS 102 via the allocated forward link traffic channel. Preferably BS 110 informs MS 102 that the BS has acquired the allocated reverse link traffic channel by conveying a Base Station Acknowledgment Order to the MS, which Base Station Acknowledgment Order requires a Layer 2 acknowledgment.

Upon being informed that BS 110 has acquired the allocated reverse link traffic channel, MS 102 acknowledges receipt of the acquisition information to BS 110, preferably by conveying a Mobile Station Acknowledgment Order to the BS, and further conveys null traffic channel data to the BS over the allocated reverse link traffic channel.

Upon receiving the acknowledgement of receipt of the acquisition information and the null traffic channel data from MS 102, BS 110 conveys to MS 102 information requesting a list of service configurations supported by MS 102. Preferably, the information requesting a list of service configurations is included in a Status Request/Status Response Order. Upon receiving the selected bearer format type information from the transcoder controller 145, BS 110 further conveys to MS 102 information specifying a service configuration of the call, including a requested bearer format type. Preferably, the information specifying a service configuration of the call is included in a Service Connect Message/Service Response Order. Upon receiving the information specifying a service configuration of the call, MS 102 informs BS 110 that the MS is able to support the specified service configuration, including the requested bearer format type, preferably by conveying a Service Connect Completion Message to the BS, and begins processing bearer traffic in accordance with the specified service configuration.

After a radio traffic channel is set up, that is, after a forward link traffic channel and a reverse link traffic channel in air interface 104 are established and fully interconnected, BS 110 determines (226), based in part on the service option assigned to the MS, the bearer format types mutually supported by each of MS 102 and transcoder 116 of BSC 114. BS 110 conveys (228) to packet switched controller 144, and in particular transcoder controller 145, information concerning the mutually supported bearer format types, which mutually supported bearer format may be formatted in an order of preference by the BS. Preferably, BS 110 informs packet switched controller 144 of the supported bearer format types in a modified version of an Assignment Complete message as is known in the art, which Assignment Complete message is modified to include an ordered preference of bearer format types data field. For example, BS 110 may inform of the bearer format types mutually supported by MS 102 and BS 110 by embedding in the bearer format type data field of the modified Assignment Complete message one or more of the following values, which values each corresponds to a following bearer format type, '0001'=SMV,
'0010'=EVRC,
'0011'=13 k-QCELP,
'0100'=8 k-QCELP, and
'0101'=G.711.

BS 110 may qualify the bearer format types mutually supported by MS 102 and BS 110 according to available format types that may have been received in the Assignment Request message.

When packet switched controller 144, and in particular transcoder controller 145, fails to receive (230) the information concerning the mutually supported bearer format types prior to an expiration of the second time period, as measured by the second timer, logic flow diagram 200 proceeds to step 216, where the packet switched controller, and in particular the transcoder controller, reconveys the assignment message to BS 110. When transcoder controller receives (230) the information concerning the bearer format types mutually supported by MS 102 and infrastructure 180, and more specifically BS 110, prior to an expiration of the second time period, transcoder controller 145 stops (232) the second timer, $T_{10}$, and stores (234), in the one or more memory devices 147 of transcoder controller 145 and further in association with BSC 109, or BS 110, the mutually supported bearer format types received from BS 110.

Based at least in part on the information received from BS 110 concerning the mutually supported bearer format types, transcoder controller 145 determines (236), that is, selects, a bearer format type for transport of voice packets over the packet switched core network, that is, between BS 110 and Media Gateway 160, during the communication session. The selection of the bearer format type for transport of voice packets over the packet switched core network may be further based on the bearer format types supported by Media Gateway 160, that is, by transcoder 161 of the Media Gateway, which bearer format types are known to the transcoder controller and may be included in the assignment message conveyed to BS 110 and subsequently reflected in the mutually supported bearer format types conveyed by the BS to packet switched controller 144. Based at least in part on the mutually supported bearer format types received from BS 110 and bearer format types supported by one or more of transcoder 116 of BS 110 and transcoder 161 of Media Gateway 160, transcoder controller 145 further determines (238) where to transcode in infrastructure 180, that is, selects a transcoder of transcoder 116 of BSC 114/BS 110 and transcoder 161 of Media Gateway 160 to transcode voice during the communication session involving MS 102, thereby producing a selected transcoder.

In one embodiment of the present invention, transcoder controller 145 may select a bearer format type based on minimizing number of bearer interworking functions, that is, based on minimizing a quantity of separate transcoding functions that are applied to the bearer traffic. Transcoder controller 145 may then preferentially, or in default, select a transcoder location of Media Gateway 160, that is, transcoder 161, and may select a transcoder location of BS 110, that is, transcoder 116, if the selected bearer format type is not supported or available in Media Gateway 160. In other embodiments of the present invention, transcoder controller 145 may determine the bearer format type and where to transcode the voice data in infrastructure 180 based on bearer format types, such as one or more compressed bearer format types, such as SMV, EVRC, 13 k, or 8 k, or one or more uncompressed bearer format type, such as G.711, supported by a transcoder of remote packet voice network 192 or by a transcoder of a destination MS (not shown) serviced by remote packet voice network 192. In still other embodiments of the present invention, transcoder controller 145 may determine the bearer format type and where to transcode voice in infrastructure 180 based on bearer format type preferences for packet switched core network 192, which preferences are maintained in the one or more memory devices 147 of the transcoder controller. However, those who are of ordinary skill in the art realize that many algorithms may be used herein for determining the bearer format type and where to transcode in infrastructure 180 without departing from the spirit and scope of the present invention.

For example, as noted above in one embodiment of the present invention, with respect to performing step 238, transcoder controller 145 may be configured to select the transcoder of the upstream network element, that is, transcoder 161 of Media Gateway 160, whenever the transcoder of the upstream network element supports the bearer format type determined by the transcoder controller to be used for transport of voice packets over the packet switched core network. In the event that the transcoder of the upstream network element does not support the determined bearer format type and the transcoder of the downstream network element, that is, transcoder 116 of BS 110, supports the determined bearer format type, then transcoder controller 145 selects the transcoder of the downstream network element.

In another embodiment of the present invention, with respect to performing step 238, transcoder controller 145 may be configured to select the transcoder of the downstream network element, that is, transcoder 116 of BS 110, whenever the transcoder of the downstream network element supports the bearer format type determined by the transcoder controller to be used for transport of voice packets over the packet switched core network. In the event that the transcoder of the downstream network element does not support the determined bearer format type and the transcoder of the upstream network element, that is, transcoder 161 of Media Gateway 160, supports the determined bearer format type, transcoder controller 145 may select the transcoder of the upstream network element.

In still another embodiment of the present invention, with respect to performing step 238, transcoder controller 145 may select one of the transcoder of the upstream network element and the transcoder of the downstream network element based on a network-element processing load. For example, when the processing load of the upstream network element, that is, Media Gateway 160, exceeds a processing load threshold, transcoder controller 145 may select the transcoder of the downstream network element, that is, transcoder 116 of BS 110. Otherwise, transcoder controller 145 selects the transcoder of the upstream network element. In still another embodiment of the present invention, with respect to performing step 238, transcoder controller 145 may select one of the transcoder of the upstream network element and the transcoder of the downstream network element based on a load of the packet switched core network in order to assure that voice data is transported in a compressed format over the packet switched core network when the network load is high, that is, exceeds a network load threshold.

In response to determining a bearer format type for transport of voice packets over the packet switched core network and further determining where to perform transcoding in infrastructure 180, transcoder controller 145 instructs (240) a network element associated with the selected transcoder, such as BS 108 or BSC 110 with respect to transcoder 116 or Media Gateway 160 with respect to transcoder 161, via a corresponding signaling interface, to transcode the bearer path of the communication session. In response to receiving the transcoding instruction, the network element inserts (242) the selected transcoder into the bearer path and the selected transcoder transcodes the voice. Logic flow 200 then ends. In another embodiment of the present invention, instead of instructing a network element associated with the selected transcoder to transcode, transcoder controller 145 may instruct (244) network elements not associated with the selected transcoder not to transcode the bearer path of the communication session. In response to receiving the instruction not to transcode, the network element removes (246) the selected transcoder into the bearer path so that only the selected transcoder transcodes the voice.

By determining a bearer format type for a transcoding of voice during a communication session and selecting a transcoder of multiple transcoders 116, 161, that are associated with respective network elements 110, 161, to transcode the voice based on the determined bearer format type and bearer format types supported by one or more of the multiple transcoders, communication system 100 is able to control where, in the system, the transcoding function is performed and what transcoding type(s) should be used in the serving network elements. A downstream network element, such as BS 110, determines one or more bearer format types mutually supported by the downstream network element and an MS 102 engaging in the communication session. The downstream network element conveys the mutually supported bearer format types to a transcoder controller 145 that determines a bearer format type for transport of voice packets over the packet switched core network based at least in part on the mutually supported bearer format types, which mutually supported bearer format types may reflect one or more bearer format types supported by an upstream network element, such as Media Gateway 160. Based on the determined bearer format type, transcoder controller 145 then determines where to perform the transcoding, that is, whether to transcode in the downstream network element or the upstream network element, or more particularly in a transcoder of the downstream network element or a transcoder of the upstream network element. The transcoder of the selected element of then performs the transcoding function.

For example, upon selecting the transcoder of the upstream network element, that is, transcoder 161 of Media Gateway 160, to transcode the communication session, transcoder controller 145 may instruct Media Gateway 160 to insert transcoder 161 in the path of the bearer traffic, that is, to transcode the voice packets exchanged during the communication session and/or may instruct BS 110 not to insert transcoder 116 in the path of the bearer traffic, that is, the voice data. By way of another example, upon selecting the transcoder of the downstream network element, that is, transcoder 116 of BS 110, to transcode the communication session, transcoder controller 145 may instruct BS 110 to insert transcoder 116 in the path of the bearer traffic and/or may instruct Media Gateway 160 not to insert transcoder 161 in the path of the bearer traffic. And if transcoder controller 145 determines not to transcode in infrastructure 180, then the transcoder controller may not instruct each of Media Gateway 160 and BS 110 to insert their respective transcoders 116, 161, in the path of the bearer traffic or may instruct each of Media Gateway 160 and BS 110 not to insert their respective transcoders 116, 161, in the path of the bearer traffic.

In yet another embodiment of the present invention, packet switched controller 144, and in particular transcoder controller 145, may determine during the course of the communication session to transfer a transcoding function from a selected transcoder, such as, transcoder 161 of Media Gateway 160, to a non-selected transcoder, such as transcoder 116 of BS 110. Referring now to FIG. 3, a logic flow diagram 300 is provided that illustrates a transfer of a transcoding function within infrastructure 180 by communication system 100 in accordance with another embodiment of the present invention. Logic flow diagram 300 begins when, during the course of an active communication session, transcoder controller 145 determines (302) to transfer a transcoding function from a first transcoder that has been selected to transcode voice, such as a transcoder 161 in Media Gateway 160, to a second transcoder, that is, a non-selected transcoder, that was not selected to transcode voice, such as transcoder 116 in BS 110, wherein the selected transcoder is either upstream of, or downstream of, the non-selected transcoder.

Upon determining to transfer the transcoding function from the selected transcoder to the non-selected transcoder, transcoder controller 145 conveys (304) a first transcoder transfer message comprising information concerning a requested bearer format type to the network element associated with the non-selected transcoder, that is, BS 110. The requested bearer format type may be a new bearer format type, that is, may or may not be the same bearer format type as the bearer format type currently being applied to the voice communications. By conveying a request bearer format type to the network element associated with the non-selected transcoder, transcoder controller 145 is able to change both bearer format type and transcoding location during an on-going communication session. Preferably, transcoder controller 145 determines the requested bearer format type based on the bearer format types supported by the non-selected transcoder, that is, transcoder 116, and stored in the one or more memory devices 147. However, in another embodiment of the present invention, transcoder controller 145 may not know that the network element associated with the non-selected transcoder supports the requested bearer format type until the transcoder controller receives an acceptance of the requested bearer format type from the network element. The first transcoder transfer message may further comprise the bearer address, that is, the $A2_p$ address, of the network element associated with the selected transcoder, that is, Media Gateway 160, and an indication of when the transfer is to be effective, such as a frame count, a time stamp, or a reception of data packets with a changed bearer format type. Preferably, the transcoder transfer message comprises a Change Bearer Request Message.

In response to receiving the first transcoder transfer message, the network element associated with the non-selected transcoder, that is BS 110, conveys (306) a transcoder transfer response message, preferably a Change Bearer Response Message, to transcoder controller 145 informing of acceptance of the requested bearer format type. The transcoder transfer response message may further inform of a bearer address, preferably an $A2_p$ address, of the network element associated with the non-selected transcoder, that is, BS 110. In response to receiving the first transcoder transfer message, and at the indicated time when a transfer time is indicated, the network element associated with the non-selected transcoder that is BS 110, inserts (308) the non-selected transcoder, that is, transcoder 116, into the bearer path of the bearer traffic, that is, the voice data, and the non-selected transcoder begins transcoding the voice data.

Transcoder controller 145 further conveys (310) a second transcoder transfer message to the network element associated with the selected transcoder, that is, Media Gateway 160, instructing the network element associated with the selected transcoder to remove the selected transcoder, that is, transcoder 161, from the path of the bearer traffic. In an embodiment of the present invention wherein transcoder controller 145 does not know that the network element associated with the non-selected transcoder supports the requested bearer format type, the transcoder controller may not convey the second transcoder transfer message until the transcoder controller receives an acceptance of the requested bearer format type from the network element associated with the non-selected transcoder. Like the first transcoder transfer message, the second transcoder transfer message may include an indication of when the transfer is to be effective. Upon receiving the second transcoder transfer message, or at the indicated time when a transfer time is indicated, the network element associated with the selected transcoder, that is, Media Gateway 160, removes (312) the selected transcoder, that is, transcoder 161, from the path of the bearer traffic. Logic flow 300 then ends (314).

By permitting transcoder controller 145 to change a bearer format type and a transcoding location during the course of an on-going communication session, communication system 100 is capable of adapting to changes in bearer interactions with other core network elements, such as conference bridges, announcement servers, and so on. Accordingly, communication system 100 provides a distributed transcoding system comprising multiple network elements that are each capable of transcoding voice during a communication session, wherein the communication system is capable of both determining a bearer format type and a transcoding location for the communication session and of changing the bearer format type and the transcoding location for the communication session when desirable.

While the present invention has been particularly shown and described with reference to particular embodiments thereof, it will be understood by those skilled in the art that various changes may be made and equivalents substituted for elements thereof without departing from the scope of the invention as set forth in the claims below. Accordingly, the specification and figures are to be regarded in an illustrative rather then a restrictive sense, and all such changes and substitutions are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus. It is further understood that the use of relational terms, if any, such as first and second, top and bottom, and the like are used solely to distinguish one entity or action from another entity or action without necessarily requiring pr implying any actual such relationship or order between such entities or actions.

What is claimed is:

1. In a wireless communication system having an infrastructure comprising a first network element and a second network element, wherein the second network element comprises a second transcoder and resides in a radio access network and the first network element comprises a first transcoder and is external to the radio access network, a method for controlling a transcoding of voice during a communication session comprising:
   determining a first bearer format type supported by the first transcoder;
   determining a second bearer format type mutually supported by a mobile station and the second network element;
   determining that the first bearer format type is the same as the second bearer format type; and
   selecting one of the first transcoder and the second transcoder to transcode the voice based on the first bearer format type and the second bearer format type, wherein the first and second network elements are in a voice path of the mobile station.

2. The method of claim 1, further comprising instructing the network element comprising the selected transcoder to transcode the voice.

3. The method of claim 2, further comprising transcoding the voice data by the selected transcoder.

4. In a wireless communication system having an infrastructure comprising a first network element and a second network element, wherein the second network element comprises a second transcoder and resides in a radio access network and the first network element comprises a first transcoder and is external to the radio access network, a method for controlling a transcoding of voice during a communication session comprising:
   determining a first bearer format type supported by the first transcoder;
   determining a second bearer format type mutually supported by a mobile station and the second network element; and
   selecting one of the first transcoder and the second transcoder to transcode the voice based on the first bearer format type and the second bearer format type, wherein the first and second network elements are in a voice path of the mobile station and wherein selecting comprises:
      determining, based on the first bearer format type and the second bearer format type, that the first transcoder does not support the second bearer format type; and
      selecting the second transcoder to transcode the voice.

5. In a wireless communication system having an infrastructure comprising a first network element and a second network element, wherein the second network element comprises a second transcoder and resides in a radio access network and the first network element comprises a first transcoder and is external to the radio access network, a method for controlling a transcoding of voice during a communication session comprising:
   determining a first bearer format type supported by the first transcoder;
   determining a second bearer format type mutually supported by a mobile station and the infrastructure;
   selecting one of the first transcoder and the second transcoder to transcode the voice based on the first bearer format type and the second bearer format type, wherein the first and second network elements are in a voice path of the mobile station;
   determining to change transcoders;
   conveying a requested bearer format type to the network element associated with the non-selected transcoder; and
   in response to receiving the requested bearer format type, transcoding, by the non-selected transcoder, the voice.

6. The method of claim 5, wherein the requested bearer format type is different than a bearer format type currently being utilized in the communication session.

7. The method of claim 5, wherein transcoding, by the non-selected transcoder, the voice data comprises:
   accepting, by the network element associated with the non-selected transcoder, the requested bearer format; and
   inserting the non-selected transcoder into the path of the voice.

8. A transcoder controller for operation in a wireless infrastructure comprising a first network element and a second network element, the transcoder controller comprising:
   at least one memory device that maintains a first bearer format type supported by a first transcoder associated with the first network element; and
   a processor coupled to the at least one memory device that receives a second bearer format type mutually supported by a mobile station and a second transcoder associated with the second network element, determines that the first bearer format type is the same as the second bearer format type, and selects one of the first transcoder and the second transcoder to transcode voice of a communication session based on the first bearer format type and the second bearer format type, wherein the first and second network elements are in a voice path of the mobile station.

9. The transcoder controller of claim 8, wherein the processor further instructs the network element comprising the selected transcoder to transcode voice.

10. A transcoder controller for operation in a wireless infrastructure comprising a first network element and a second network element, the transcoder controller comprising:

at least one memory device that maintains a first bearer format type supported by a first transcoder associated with the first network element; and a processor coupled to the at least one memory device that receives a second bearer format type mutually supported by a mobile station and a second transcoder associated with the second network element, determines, based on the first bearer format type and the second bearer format type, that the first transcoder does not support the second bearer format type and selects the second transcoder to transcode voice based on the first bearer format type and the second bearer format type, wherein the first and second network elements are in a voice path of the mobile station.

11. A transcoder controller for operation in a wireless infrastructure comprising a first network element and a second network element, the transcoder controller comprising:

at least one memory device that maintains a first bearer format type supported by a first transcoder associated with the first network element; and a processor coupled to the at least one memory device that receives a second bearer format type mutually supported by a mobile station and a second transcoder associated with the second network element and selects one of the first transcoder and the second transcoder to transcode voice of a communication session based on the first bearer format type and the second bearer format type, wherein the first and second network elements are in a voice path of the mobile station, determines to change transcoders, and conveys a requested bearer format type to the network element associated with the non-selected transcoder.

12. The transcoder controller of claim 11, wherein the requested bearer format type is different than a bearer format type currently being utilized in the communication session.

13. The transcoder controller of claim 11, wherein the processor further receives an acceptance of the requested bearer format from the network element associated with the non-selected transcoder.

14. A distributed transcoding system comprising:
a first network element comprising a first transcoder;
a second network element comprising a second transcoder, wherein the second network element resides in a radio access network and the first network element is external to the radio access network; and
a transcoder controller coupled to each of the first network element and the second network element that maintains a first bearer format type supported by the first transcoder, receives a second bearer format type that is mutually supported by a mobile station and the second transcoder, determines that the first bearer format type is the same as the second bearer format type, and selects one of the first transcoder and the second transcoder to transcode voice of a communication session based on the first bearer format type and the second bearer format type, wherein the first and second network elements are in a voice path of the mobile station.

15. The distributed transcoding system of claim 14, wherein the transcoder controller further instructs the network element comprising the selected transcoder to transcode voice.

16. The distributed transcoding system of claim 15, wherein the selected transcoder transcodes voice.

17. A distributed transcoding system comprising:
a first network element comprising a first transcoder;
a second network element comprising a second transcoder, wherein the second network element resides in a radio access network and the first network element is external to the radio access network; and
a transcoder controller coupled to each of the first network element and the second network element that maintains a first bearer format type supported by the first transcoder, receives a second bearer format type that is mutually supported by a mobile station and the second transcoder, determines, based on the first bearer format type and the second bearer format type, that the first transcoder does not support the first bearer format type, and selects the second transcoder to transcode voice based on the first bearer format type and the second bearer format type, wherein the first and second network elements are in a voice path of the mobile station.

18. A distributed transcoding system comprising:
a first network element comprising a first transcoder;
a second network element comprising a second transcoder, wherein the second network element resides in a radio access network and the first network element is external to the radio access network; and
a transcoder controller coupled to each of the first network element and the second network element that maintains a first bearer format type supported by the first transcoder, receives a second bearer format type that is mutually supported by a mobile station and the second transcoder, selects one of the first transcoder and the second transcoder to transcode voice of a communication session based on the first bearer format type and the second bearer format type, wherein the first and second network elements are in a voice path of the mobile station, determines to change transcoders, and conveys a requested bearer format type to the network element associated with the non-selected transcoder, and wherein, in response to the network element associated with the non-selected transcoder receiving the requested bearer format, the non-selected transcoder begins transcoding voice.

19. The distributed transcoding system of claim 18, wherein the requested bearer format type is different than a bearer format type currently being utilized in the communication session.

20. The distributed transcoding system of claim 18, wherein the network element associated with the non-selected transcoder conveys an acceptance of the requested bearer format to the transcoder controller and inserts the non-selected transcoder into the voice path.

* * * * *